(12) United States Patent
Kunert

(10) Patent No.: US 8,931,348 B2
(45) Date of Patent: Jan. 13, 2015

(54) PRESSURE SENSOR

(75) Inventor: Peter Kunert, Lichtenstein (DE)

(73) Assignee: Robert Bosch GmbH, Stuttgart (DE)

( * ) Notice: Subject to any disclaimer, the term of this patent is extended or adjusted under 35 U.S.C. 154(b) by 586 days.

(21) Appl. No.: 13/125,781

(22) PCT Filed: Sep. 17, 2009

(86) PCT No.: PCT/EP2009/062048
§ 371 (c)(1),
(2), (4) Date: Jul. 21, 2011

(87) PCT Pub. No.: WO2010/054881
PCT Pub. Date: May 20, 2010

(65) Prior Publication Data
US 2011/0265577 A1    Nov. 3, 2011

(30) Foreign Application Priority Data

Nov. 11, 2008  (DE) .......................... 10 2008 043 644

(51) Int. Cl.
*G01L 7/08*   (2006.01)
*B60R 21/0136*   (2006.01)
*B60R 21/00*   (2006.01)

(52) U.S. Cl.
CPC ..... B60R 21/0136 (2013.01); *B60R 2021/0006* (2013.01)
USPC .............................................. 73/715; 73/714

(58) Field of Classification Search
USPC ..................... 73/715, 12.09, 714; 361/283.1
See application file for complete search history.

(56) References Cited

U.S. PATENT DOCUMENTS

| | | | | |
|---|---|---|---|---|
| 5,174,156 A | * | 12/1992 | Johnson et al. | 73/715 |
| 6,813,953 B2 | * | 11/2004 | Baba et al. | 73/715 |
| 6,945,120 B1 | * | 9/2005 | Marcus et al. | 73/756 |
| 7,162,927 B1 | * | 1/2007 | Selvan et al. | 73/753 |
| 7,171,856 B2 | * | 2/2007 | Koike et al. | 73/718 |
| 7,311,006 B2 | * | 12/2007 | Yamashita | 73/716 |
| 7,331,238 B2 | | 2/2008 | Wanami et al. | |
| 8,353,214 B2 | * | 1/2013 | Adam et al. | 73/706 |
| 2003/0150275 A1 | * | 8/2003 | Wagner et al. | 73/715 |
| 2006/0236749 A1 | | 10/2006 | Wanami et al. | |

FOREIGN PATENT DOCUMENTS

| | | |
|---|---|---|
| CN | 1846994 | 4/2007 |
| CN | 1950241 | 4/2007 |
| DE | 10 2006 040 216 | 3/2007 |
| DE | 10 2006 024 666 | 11/2007 |
| DE | 10 2006 051 295 | 4/2008 |
| JP | 54-074579 | 11/1952 |
| JP | 57-168133 | 10/1982 |
| JP | 63-3468 | 1/1988 |
| JP | 64-50454 | 3/1989 |
| JP | H 08-178778 | 7/1996 |
| JP | 8-226863 | 9/1996 |
| JP | 2007-78461 | 3/2007 |

\* cited by examiner

*Primary Examiner* — Lisa Caputo
*Assistant Examiner* — Punam Roy
(74) *Attorney, Agent, or Firm* — Kenyon & Kenyon LLP

(57) ABSTRACT

A pressure sensor is provided which is suitable as an airbag sensor of a vehicle. The pressure sensor includes a pressure chamber having a small opening and a large opening, a pressure sensor element having a pressure receiving surface, and a diaphragm. The diaphragm is designed to seal the large opening. The pressure sensor element is designed to seal the small opening at least using the pressure receiving surface.

9 Claims, 2 Drawing Sheets

PRESSURE SENSOR

CROSS-REFERENCE TO RELATED APPLICATIONS

This application is a National Stage application of international application PCT/EP09/62048 filed on Sep. 17, 2009, which claimed priority to German patent application No. 102008043644.5 filed on Nov. 11, 2008. Both the international application and the German application are incorporated herein by reference in their entireties.

FIELD OF THE INVENTION

The present invention relates to a pressure sensor, which is suitable as an airbag sensor of a vehicle.

SUMMARY OF THE INVENTION

German Patent No. DE 10 2006 024 666 describes an impact detection device in which at least one air pressure sensor situated in a side part of a vehicle detects the impact as a function of a signal.

In a side airbag sensor based on a pressure sensor (PPS: peripheral pressure sensor), the airbag is triggered in the event of a crash due to the change in pressure in a closed volume, for example of a vehicle door. Protecting the pressure sensor against media and moisture is complex in its implementation.

Designing the pressure sensor with the aid of a thin film as the pressure diaphragm substantially alters the sensor's response behavior. In particular, the sensitivity of the pressure sensor is greatly reduced, and dynamic pressure changes may not be detected with sufficient accuracy.

Against this background, the present invention provides a pressure sensor, which is suitable as an airbag sensor of a vehicle.

The present invention is based on the finding that dynamic pressure changes in the pressure sensor environment may be amplified by selectively positioning a sensor element, a diaphragm and a reference volume. A mechanical amplification of a pressure signal for a PPS pressure sensor including a diaphragm is provided for this purpose.

Due to the approach according to the present invention, dynamic pressure changes may be advantageously detected and evaluated with sufficient accuracy.

The present invention provides a pressure sensor which is suitable as an airbag sensor of a vehicle, including the following features: a pressure chamber having a small opening and a large opening; a pressure sensor element having a pressure receiving surface, the pressure sensor element being designed to seal the small opening at least using the pressure receiving surface; and having a diaphragm which is designed to seal the large opening.

The pressure chamber may be completely sealed by the diaphragm, on the one hand, and by the pressure sensor element, on the other hand. The pressure sensor element may be any element which is suitable for detecting the pressure in the pressure chamber and for providing a sensor signal corresponding to the pressure. The pressure is detected via the pressure receiving surface of the pressure sensor element. The pressure receiving surface has a smaller area than the diaphragm. As a result, the small opening in the pressure chamber may have a smaller cross section or a smaller opening area than the large opening. Due to the different sizes of the openings, the shape of the pressure chamber may be adjusted in such a way that the diaphragm area is as large as possible, the area of the pressure receiving surface is as small as possible, and the volume sealed by the pressure chamber is as small as possible.

According to one embodiment, the pressure chamber may have a wall section which tapers in the direction of the small opening. In this way, the volume of the pressure chamber may be reduced, and the quality of the pressure transmission to the pressure receiving surface may be increased.

The tapering wall section may be provided with a straight design. The straight design may be implemented economically.

As an alternative, the tapering wall section may be provided with a curved design. This enables the volume of the pressure chamber to be further reduced.

The diaphragm may have a predetermined arch at a maximum pressure to be detected. Therefore, the tapering wall section may have a shape which is adapted to the predetermined arch, so that the diaphragm runs parallel to the tapering wall section, at least in sections, at the maximum pressure to be detected. The volume of the pressure chamber may be reduced to a minimum value in this way. The maximum pressure to be detected may define an upper pressure limit of the operating range of the pressure sensor.

Furthermore, the pressure chamber may have a cylindrical wall section which is situated between the small opening and the tapering wall section. The pressure chamber may thus have a funnel-shaped design.

The small and/or large opening(s) in the pressure chamber may have a rectangular cross section.

According to one embodiment, the pressure sensor may have a pressure compensation element which is designed to provide a pressure compensation between the pressure chamber and an environment of the pressure sensor. For example, atmospherically induced changes in air pressure may be compensated in this way.

Furthermore, the pressure sensor may have a cover which is designed to cover a side of the diaphragm diametrically opposed to the pressure chamber. The cover may be used to protect against mechanical damage to the diaphragm.

The cover may include an opening having an adjacent pressure inlet channel, the pressure inlet channel completely spanning the opening. The ambient pressure may thus act directly upon the diaphragm, on the one hand, and the diaphragm is protected, for example, against spray water, on the other hand.

The present pressure sensor is an air pressure sensor.

DETAILED DESCRIPTION

Figure 1:
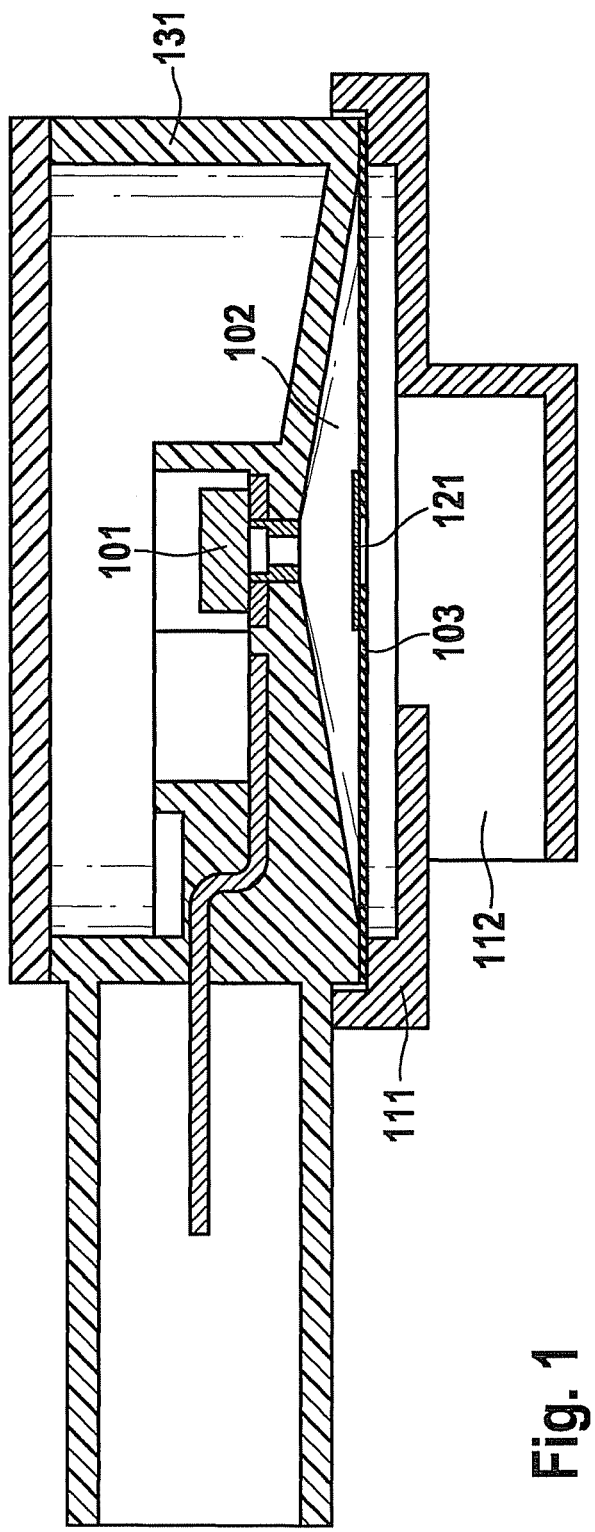
FIG. 1 shows a representation of a pressure sensor according to an exemplary embodiment of the present invention.

FIG. 1 shows a representation of a pressure sensor according to an exemplary embodiment of the present invention. The pressure sensor may be used, for example, as an airbag sensor of a vehicle. For this purpose, the pressure sensor may detect a pressure change induced by a collision and provide a corresponding control signal to an airbag control unit. In particular, the pressure sensor may be designed to detect rapid pressure peaks. To detect the pressure, the pressure sensor may be situated, for example, in a door of a vehicle.

The pressure sensor includes a pressure sensor element 101, a pressure chamber 102 and a diaphragm 103. Pressure chamber 102 is situated between pressure sensor element 101 and diaphragm 103. Pressure chamber 102 has a small opening and a large opening. The small opening may be situated diametrically opposed to the large opening. The small opening in pressure chamber 102 is sealed by pressure sensor element 101 and, in particular, by a pressure receiving surface of pressure sensor element 101. The pressure receiving surface is designed to detect the pressure within pressure chamber 102. The large opening in pressure chamber 102 is sealed by diaphragm 103. Pressure chamber 102 thus includes an enclosed volume. If the pressure outside the pressure sensor changes, this produces a deformation of diaphragm 103 and thus a pressure change within pressure chamber 102. The pressure change may be detected by pressure sensor element 101.

Pressure chamber 102 produces a transition from a large volume to a small volume. In particular, a large pressure impact surface of diaphragm 103 is translated to a small pressure impact surface of pressure sensor element 101. A pressure change outside pressure chamber 102 may be amplified thereby, and it may be detected more accurately by pressure sensor element 101.

According to this exemplary embodiment, pressure chamber 102 has a funnel-shaped design. A wall area of the pressure chamber surrounding and adjacent to diaphragm 103 tapers in the shape of a cone in the direction of pressure sensor element 101. The walls may run in a straight line. A wall area of the pressure chamber surrounding and adjacent to pressure sensor element 101 may be provided with a cylindrical design. According to this exemplary embodiment, a distance between diaphragm 103 and pressure sensor element 101 is smaller than a diameter of the large opening in pressure chamber 102 or diaphragm 103.

The tapering wall area may also have a curved or parabolic design. In particular, the tapering wall area may be adapted to a deflection curve of the diaphragm which appears at a maximum pressure to be detected by the pressure sensor. In this way, the volume of pressure chamber 102 may be minimized as much as possible. However, steps may be taken to ensure that diaphragm 102 does not strike against an inner wall of pressure chamber 102 within the measuring range of the pressure sensor.

The openings in pressure chamber 102 sealed by diaphragm 103 and by pressure sensor element 101 may be provided with a rectangular design.

As an alternative, a round, an oval or another type of cross section may also be selected.

According to this exemplary embodiment, the pressure sensor has a cover 111 which surrounds diaphragm 103 on the side diametrically opposed to pressure chamber 102. Cover 111 has an opening on which a pressure inlet channel 112 is positioned. Diaphragm 103 is connected directly to an environment of the pressure sensor by pressure inlet channel 112 and the opening in cover 111. On the side of cover 111 facing away from diaphragm 103, pressure inlet channel 112 runs from one side of the pressure sensor to the opening in cover 111, parallel to diaphragm 103. The opening in cover 111 is completely spanned by pressure inlet channel 112 and thus shielded against external influences.

The pressure sensor may be situated in a door of a vehicle in such a way that diaphragm 103 and thus also pressure inlet channel 112 are located on the bottom side of the pressure sensor.

The pressure sensor may optionally include a pressure compensation element (PCE) 121. Known pressure compensation elements 121 may be used which are suitable for producing a pressure compensation between pressure chamber 102 and an environment of the pressure sensor. According to this exemplary embodiment, diaphragm 103 includes pressure compensation element 121. Pressure compensation element 121 may be designed as a Gore diaphragm.

The pressure sensor may furthermore include a housing 131 which surrounds pressure chamber 102 and pressure sensor element 101.

Figure 2:
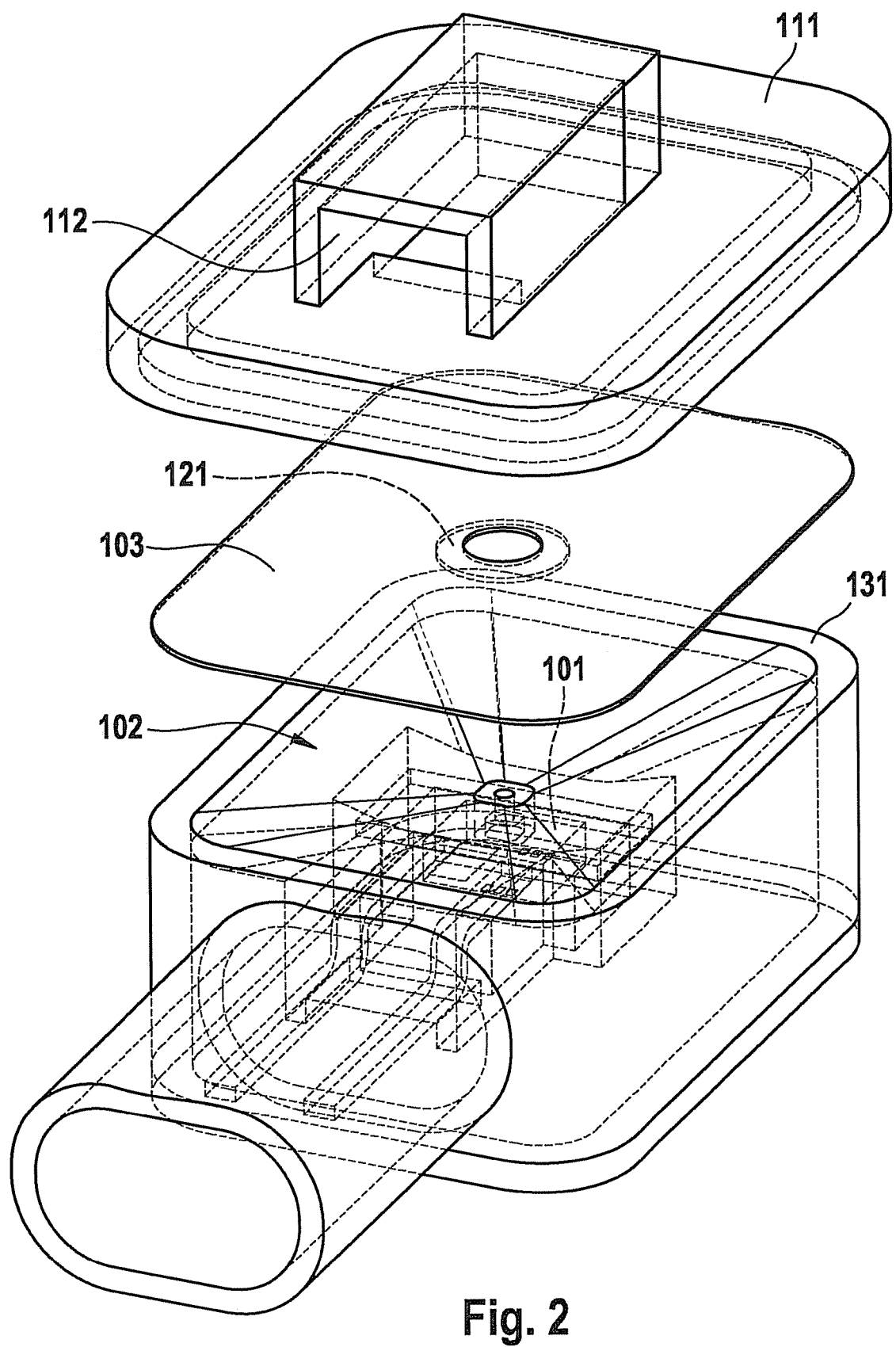
FIG. 2 shows a further representation of the pressure sensor according to the present invention.

FIG. 2 shows a further three-dimensional representation of the pressure sensor illustrated in FIG. 1. In particular, cover 111 having pressure inlet channel 112 is shown. The cover is designed as a cap which offers protection against mechanical damage to diaphragm 103. Diaphragm 103 has a rectangular shape with rounded corners. In its center, diaphragm 103 has a round opening which is sealed by pressure compensation element 121.

FIG. 2 also shows housing 131, in which funnel-shaped pressure chamber 102 is situated. Pressure chamber 102 may be formed by housing 131.

The pressure sensor according to the present invention has an integrated mechanical pressure amplification system in the form of pressure chamber 102 and diaphragm 103. Diaphragm 103 may be any suitable pressure diaphragm, for example a diaphragm in the form of a thin film.

The quality of a pressure transmission via diaphragm 103 depends on multiple factors. Thus, the pressure transmission is influenced by the thickness of the diaphragm, a modulus of elasticity of the diaphragm, an edge length of the diaphragm, a closed volume behind the diaphragm and the applied pressure. The factors, weighted differently, come into play in the context which determines the quality of the pressure transmission. However, the edge length of the diaphragm is the greatest influencing factor.

To maintain the enclosed volume behind diaphragm 103 at a constant level, the height of the enclosed volume is reduced as the edge length of diaphragm 103 increases. The enclosed volume corresponds to the volume of pressure chamber 102. If enclosed volume 102 behind diaphragm 103 is further reduced, a deflection of diaphragm 103 due to the outer pressure produces a greater pressure increase within enclosed volume 102. This pressure increase may be easily detected accordingly.

By designing enclosed volume 102 as a funnel or the like, volume 102 may be greatly reduced, while still producing an adequate clearance for the deflection of diaphragm 103 resulting from a pressure increase.

By matching the diaphragm size and enclosed volume 102, the necessary sensitivity of the sensor may be infinitely adjusted, and the working point may be optimally defined. Matching may be carried out during the design or manufacture of the pressure sensor. The pressure sensor may thus be adapted to different operating ranges.

To exclude the influence of static pressure changes, pressure diaphragm 103 or enclosed volume 102 may be vented via pressure compensation element 121.

The exemplary embodiments described have been selected only by way of example and may be combined with each other.

What is claimed is:

1. A pressure sensor for use as an airbag sensor of a vehicle, comprising:
   a pressure chamber having a small opening and a large opening, wherein the small opening and the large opening are connected by a tapered wall surface, wherein the wall surface is circumferentially peripheral to the small opening and the large opening;

a pressure sensor element having a pressure receiving surface, the pressure sensor element being for sealing the small opening at least using the pressure receiving surface;

a diaphragm for sealing the large opening; and a pressure compensation element for producing a pressure compensation between the pressure chamber and an environment of the pressure sensor.

2. The pressure sensor according to claim 1, wherein the wall surface tapers in a direction of the small opening.

3. The pressure sensor according to claim 2, wherein the tapering wall surface has a curved design in the direction of the small opening.

4. The pressure sensor according to claim 2, wherein the diaphragm has a predefined arch at a maximum pressure to be detected, and wherein the tapering wall surface has a shape which is adapted to the predefined arch in the direction of the small opening, so that the diaphragm runs parallel to the tapering wall surface, at least in sections, at the maximum pressure to be detected.

5. The pressure sensor according to claim 2, wherein the pressure chamber has a cylindrical wall section which is situated between the small opening and the tapering wall surface.

6. The pressure sensor according to claim 1, wherein at least one of the small opening and the large opening has a rectangular cross section.

7. The pressure sensor according to claim 1, further comprising a cover for covering a side of the diaphragm diametrically opposed to the pressure chamber.

8. The pressure sensor according to claim 7, wherein the cover includes an opening having an adjacent pressure inlet channel, the pressure inlet channel completely spanning the opening of the cover.

9. A pressure sensor for use as an airbag sensor of a vehicle, comprising:

a pressure chamber having a small opening and a large opening;

a pressure sensor element having a pressure receiving surface, the pressure sensor element being for sealing the small opening at least using the pressure receiving surface;

a diaphragm for sealing the large opening; and a pressure compensation element for producing a pressure compensation between the pressure chamber and an environment of the pressure sensor, wherein the pressure chamber has a wall surface which tapers in a direction of the small opening, wherein the tapering wall surface has a straight design in the direction of the small opening.

* * * * *